United States Patent [19]
Mitchell

[11] 3,827,153
[45] Aug. 6, 1974

[54] BRAKE SHOE GAGE

[75] Inventor: Wallace F. Mitchell, Arlington Heights, Ill.

[73] Assignee: Ammco Tools, Inc., North Chicago, Ill.

[22] Filed: Sept. 15, 1972

[21] Appl. No.: 289,401

[52] U.S. Cl........ 33/178 R, 33/180 AT, 33/143 R, 33/147 K
[51] Int. Cl............................................. E21b 47/08
[58] Field of Search .. 33/158, 164 R, 164 C, 147 T, 33/147 J, 143 J, 143 N, 143 K, 143 R, 164 D, 178 R, 180 AT, 181 AT, 143 R

[56] References Cited
UNITED STATES PATENTS

| | | | |
|---|---|---|---|
| 2,119,206 | 5/1938 | Frisz | 33/180 AT |
| 2,476,484 | 7/1949 | Epler | 33/180 AT |
| 2,769,241 | 11/1956 | Barrett | 33/147 K |
| 3,507,048 | 4/1970 | Owens | 33/143 R |

FOREIGN PATENTS OR APPLICATIONS

| | | | |
|---|---|---|---|
| 909,955 | 3/1945 | France | 33/147 |

*Primary Examiner*—William D. Martin, Jr.
*Assistant Examiner*—Willis Little
*Attorney, Agent, or Firm*—Edmond T. Patnaude

[57] ABSTRACT

A gage and method for presetting brake shoe assemblies to provide an adjustable, precise clearance between the brake shoes and brake drum upon assembly thereof.

4 Claims, 3 Drawing Figures

PATENTED AUG 6 1974　　　　　　　　　　　　　　　3,827,153

BRAKE SHOE GAGE

The present invention relates in general to an apparatus and method for adjusting internal shoe-brakes, and it relates more particularly to a new and improved apparatus and method for precisely setting the clearances between brake drums and associated brake shoes.

BACKGROUND OF THE INVENTION

For the proper operation of internal shoe-brakes, it is necessary that the brake shoes be spaced a precise distance from the drum in which the brake shoe assembly is mounted. At the present time, the specified clearance between the shoes and the drums is the same for all of the different shoe-brakes used on passenger cars. However, the desired clearance varies substantially for the different shoe-brake designs used on trucks, trailers, and buses, and it also varies with the terrain and climatic conditions where the vehicle is to be operated. The prior art method which was generally used to adjust the drum assemblies to provide these required clearances is difficult to practice and is time consuming. Moreover, if a statisfactory gage and method were available for enabling the setting of different clearances on passenger car shoe-brakes, it is believed that a variation in such clearances would be used to improve the operation thereof.

OBJECTS OF THE INVENTION

Therefore, a principal object of the present invention is to provide a new and improved method and adjustable gage for presetting the clearances between the shoes and associated drums of shoe-brakes.

Another object of this invention is to provide a new and improved gage for enabling the precise setting of the said clearances within a wide range.

SUMMARY OF THE INVENTION

Briefly, the above and further objects may be realized in accordance with the present invention by providing a gage having a pair of arms slidably mounted in parallel relationship on a crossbar, locking means on the arms for locking the arms in fixed positions on the crossbar, outwardly facing drum engaging reference surfaces on one end of the arms, and inwardly facing shoe engaging surfaces on the other ends of the arms, one of the latter surfaces being provided at the end of a micrometer screw to enable accurate setting of the shoe diameter relative to the drum diameter. In use, the arms are set along the crossbar to cause the drum engaging reference surfaces to engage diametrically opposite areas of the drum; the micrometer screw is then set to the desired clearance and the arms are placed over the shoes; the brake shoe assembly is then adjusted to cause diametrically opposite areas of the shoes to abut the shoe engaging surfaces; the gage is then removed; and the drum is assembled over the shoe assembly.

BRIEF DESCRIPTION OF THE DRAWING

Further objects and advantages and a better understanding of the invention may be had from the following detailed description taken in connection with the accompanying drawing, wherein.

DETAILED DESCRIPTION OF THE DRAWING

Figure 1:
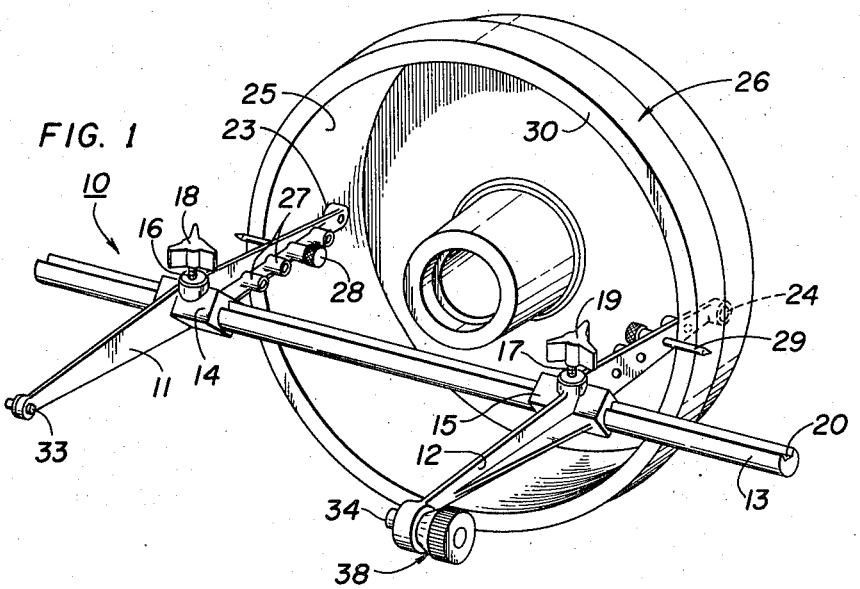
FIG. 1 is a perspective view of a gage embodying the present invention in use with a brake drum.
Figure 2:
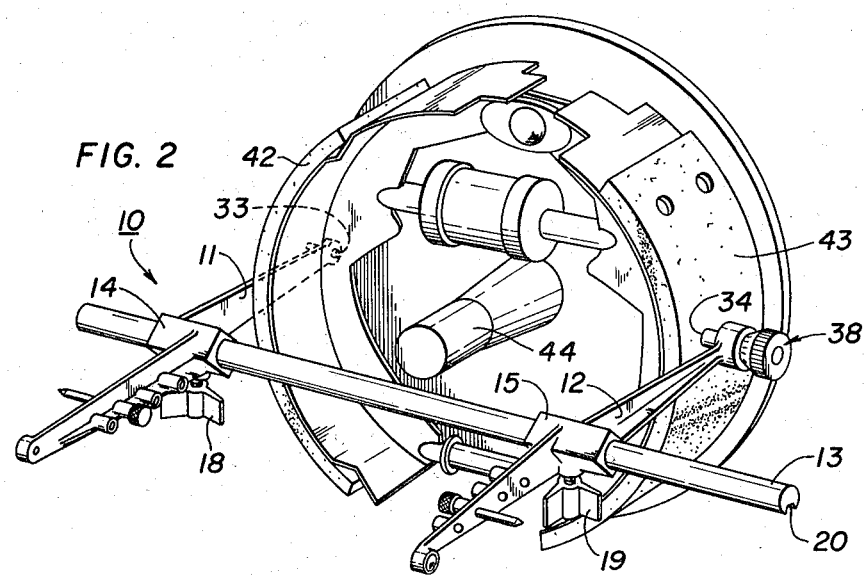
FIG. 2 is a perspective view of the gage of FIG. 1 in use with a brake shoe assembly.
Figure 3:
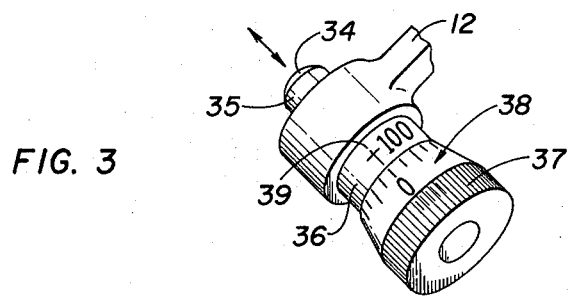
FIG. 3 is an enlarged perspective view of the micrometer adjustment screw used in the gage of FIG. 1.

Referring now the drawings, a brake shoe setting gage 10 includes a pair of rigid arms 11 and 12 slidably mounted on a rigid crossarm 13 for adjustable movement along the bar. The arms 11 and 12 are suitably cast of metal and respectively include enlarged central hub portions 14 and 15 which are bored to receive the bar 13 and to maintain the arms 11 and 12 in mutually parallel relationship. Locking screws 16 and 17 respectively threaded in suitable holes in the hub portions 14 and 15 are provided with knobs 18 and 19 for locking the arms 11 and 12 in the adjusted positions along the bar 13. As shown, the bar 13 is provided with a longitudinal groove 20 for receiving the end portions of the screws 16 and 17 to hold the arms 11 and 12 in mutually parallel relationship.

A pair of outwardly facing drum engaging reference surfaces 23 and 24 are respectively provided near one end of each of the arms 11 and 12 and in use are positioned against diametrically opposed areas on the cylindrical inner wall 25 of a brake drum 26. A plurality of bosses 27 are spatially positioned along the arms and are respectively drilled to receive a pair of stop pins 28 and 29 for limiting the depth of the reference surfaces 23 and 24 in the drum. The pins 28 and 29 are provided with knurled heads and are of sufficient length to extend the edges 30 of the brake drum when the arms are positioned therein with the reference surfaces in proximity to the drum surface.

Near the other ends of the arms 11 and 12 are mounted a pair of brake shoe gaging surfaces 33 and 34. The surface 33 is fixed relative to the arm 11 on which it is disposed, and the surface 34 is provided on the end of a micrometer screw 35 threaded in a bushing member 36 fixed to the arm 12. A control knob 37 is fixed to the screw 35 and is provided with a reference scale 38 readable in conjunction with a fixed index mark 39 on the bushing 36 to indicate the position of the gaging surface 34 relative to the reference surface 24. The reference and gaging surfaces 23, 24, 33 and 34 are convex for precise positioning against the surfaces of the drum and brake shoes. The centers of the surfaces 23 and 33 are on a line perpendicular to the line connecting the centers of the surfaces 23 and 24, and when the micrometer screw is set such that the zero mark on the knob 37 is opposite the index mark 38 the line connecting the center of the gaging surface with the center of the reference surface 24 is parallel to the corresponding line connecting the centers of the surfaces 23 and 33.

METHOD OF USE

In order to set the brake drum assembly to provide a predetermined clearance between the arcuate outer surfaces of the brake shoes 42 and 43 and the internal cylindrical surface 25 of the brake drum, the stop pins 28 and 29 are inserted in corresponding holes spaced from the reference surfaces 23 and 24 a distance less than the depth of the drum. The arms are then positioned in the drum as shown in FIG. 1 with the shanks of the stop pins 28 and 29 abutting the outer edge 30 of the drum. One or both of the locking screws 16 and 17 are then loosened and the arms 11 and/or 12 are moved outwardly until the reference surfaces 23 and 24 are in engagement with diametrically opposite locations on the inner drum surface 25. The knobs 18 and/or 19 are then rotated to fixedly lock the arms 11 and 12 in the reference positions along the bar 13. The gage may then be removed from the drum.

With the micrometer screw backed off, the other ends of the arms 11 and 12 are placed over the brake shoe assembly with the gaging surfaces 33 and 34 facing diametrically opposite areas of the brake shoes 42 and 43. Using the mirometer screw, the desired clearance is then set on the gage and the brake drum assembly is adjusted to bring the shoes into abutment with the gaging surfaces 33 and 34. The micrometer screw is then backed off and the gage is removed from the brake shoe assembly. The drum 26 may then be mounted onto the axle 44 over the brake shoe assembly. The present clearance is thus provided without any further adjustment of the brake shoe assembly.

The method and gage of the present invention thus enables a relatively simple, yet precise setting of the brake shoe assembly to provide an infinitely variable clearance within the range of the gage. For present-day vehicles it has been found that a range of clearance between zero and 0.100 inch is sufficient. If desired, however, a greater range of adjustment could be provided.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A gage for use in presetting a brake shoe assembly to provide an adjustable predetermined clearance with respect to an associated brake drum, comprising
    first and second rigid arms,
    means for adjustably mounting said arms in mutually parallel spaced relationship,
    drum engaging reference surfaces respectively provided at corresponding locations on and near one end of each of said arms,
    brake shoe engaging surfaces respectively provided at corresponding locations on and near the other ends of said arms,
    a manually adjustable micrometer screw mounted on one of said arms for perpendicular movement relative thereto,
    one of said brake shoe engaging surfaces being carried by said micrometer screw,
    adjustably located stop means including a plurality of pins insertable in selected ones of a plurality of holes in said arms for limiting the depth of said drum engaging reference surfaces in said drum.

2. A gage for use in presetting a brake shoe assembly to provide an adjustable predetermined clearance with respect to an associated brake drum, comprising
    first and second rigid arms,
    means for adjustably mounting said arms in mutually parallel spaced relationship,
    drum engaging reference surfaces respectively provided at corresponding locations on and near one end of each of said arms,
    brake shoe engaging surfaces respectively provided at corresponding locations on and near the other ends of said arms,
    a manually adjustable micrometer screw mounted on one of said arms for perpendicular movement relative thereto,
    one of said brake shoe engaging surfaces being carried by said micrometer screw,
    first and second stop means,
    said stop means each having a drum engaging surface to limit the depth of said drum engaging reference surfaces in said drum, and
    means mounting each of said stop means to a respective one one said arms at any selected one of a plurality of predetermined positions therealong,
    corresponding ones of said positions being equally spaced from said reference surfaces.

3. A gage according to claim 2 wherein said means for adjustably mounting said arms comprises
    a bar extending through elongated bores in said arms, and
    lock means mounted on said arms for engagement with said bar to lock said arms on said bar.

4. A gage according to claim 2 wherein
    said bar is provided with a longitudinal groove in which said lock means are partially disposed to maintain said arms in said mutually parallel relationship.

* * * * *